United States Patent [19]
Dukes

[11] Patent Number: 5,152,590
[45] Date of Patent: Oct. 6, 1992

[54] DEVICE FOR STORING AND AUTOMATICALLY DISPENSING BREAD

[76] Inventor: Douglas R. Dukes, P.O. Box 73, Manchester, Ga. 31816

[21] Appl. No.: 634,494

[22] Filed: Dec. 27, 1990

[51] Int. Cl.⁵ .............................................. A47F 1/00
[52] U.S. Cl. ...................................... 312/71; 312/306; 312/61
[58] Field of Search ..................... 312/61, 71, 306, 312

[56] References Cited

U.S. PATENT DOCUMENTS

| | | | |
|---|---|---|---|
| 2,418,113 | 4/1947 | Fletcher | 312/71 |
| 4,000,831 | 1/1977 | House | 221/196 |
| 4,213,540 | 7/1980 | Stanford | 221/150 |
| 4,500,145 | 2/1985 | Fassauer | 312/71 |
| 4,905,869 | 3/1990 | Grigsby et al. | 221/92 |

*Primary Examiner*—Gerald A. Anderson
*Attorney, Agent, or Firm*—Hurt, Richardson, Garner, Todd & Cadenhead

[57] ABSTRACT

An apparatus for the safe keeping and dispensation of sliced bread comprising a vertically disposed upper housing for containing said bread slices, said upper housing having an open upper end equipped with a lid, elongated vertical sides and a closed lower end secured to a lower housing or base of sufficient size and weight to support the upper housing and its contents and having a hollow interior containing a means for activating a lifting shelf surface supported said slices of bread such that upon activation of the moving means the lifting means raises the bread, thus presenting one or more slices to the user.

8 Claims, 5 Drawing Sheets

DEVICE FOR STORING AND AUTOMATICALLY DISPENSING BREAD

BACKGROUND OF THE INVENTION

1. Field of the Invention

This invention generally relates to devices for storing and dispensing common loaves of bread, and specifically concerns a relatively air-tight device which can store at least one loaf of bread and comprises a means for dispensing one or more slices of bread at a time.

2. Prior Art

Several devices exist for the storage and dispensation of bread, including the common plastic wrapper and twist-tie combination and the well-known wooden bread box. The evolution of the bread storage and dispensing art has led to the development of several devices which combine storage means with dispensing means. Three devices of which the inventor is aware include the sliced bread dispenser invented by Bruce House, disclosed in U.S. Pat. No. 4,000,831, the bread box dispenser invented by Louis Stanford, disclosed in U.S. Pat. No. 4,213,540, and the apparatus for safe storage and dispensation of sliced bread, invented by David E. Grigsby and Stanley J. Paladori, disclosed in U.S. Pat. No. 4,905,869.

U S. Pat. No. 4,000,831 discloses a bread dispensing means which dispenses one slice at a time using a spring-biased mechanism. The loaf of bread is loaded into the dispenser in a vertical fashion and rests on a plate attached to the upper end of the spring. The spring forces the loaf of bread up against a cover plate which is fashioned to allow dispensing of one slice of bread at a time. By manipulating the cover plate, the user can force one slice of bread horizontally from the top of the stack of bread slices and onto a receiving rack. However, the dispenser is not air-tight and, if the bread is left in the dispenser for an extended period of time, the bread will become stale and unfit for human consumption. Additionally, due to the horizontal force supplied to the uppermost slice of bread, there is a strong possibility that the slice of bread will be damaged when being ejected from the dispenser. Further, the spring upwardly forces the bread against the cover plate, thereby increasing the possibility that the bread will become flattened and undesirable.

U.S. Pat. No. 4,213,540 discloses a second spring-biased bread dispenser which dispenses one slice of bread at a time in a horizontal fashion. The bread is loaded horizontally into the dispenser, forcing back the spring-loaded mechanism. To remove one slice of bread, a door is opened and the first slice of bread is removed. The opening of the door forces spikes into the second slice of bread to hold the second slice and the remainder of the loaf behind the second slice inside of the dispenser. A refrigeration means is provided to retard the staling of the bread. The disadvantages associated with this dispenser include the use of retaining spikes which may damage or otherwise deform each slice of bread, making the slices unusable or undesirable. Additionally, the force of the spring-loaded mechanism against the loaf of bread may force the bread through the spikes, thus tearing the bread and, possibly, the entire loaf of bread may be ejected at once. Additionally, this dispenser is not air-tight and the loaf of bread contained within the dispenser may go stale. The provision of a refrigeration means may retard the staling, but will force the user to use cooled bread.

U.S. Pat. No. 4,905,869 discloses a double walled bread dispenser having a relatively rigid outer casing surrounding a flexible, bellows-like inner casing. The bread is loaded into the inner casing of the dispenser in a horizontal fashion. A movable platen is located between the inner bellows and the outer casing. To remove a slice of bread, the door of the dispenser is opened, and the platen is moved manually a set distance in a direction toward the opened door, thus ejecting one slice of bread. The disadvantages associated with this dispenser include the complex nature of the dual casings and the manual dispensing mechanism. Additionally, the door relies on a contact seal to preserve the freshness of the bread, and not a sealable lid.

Therefore, a need exists for an economical, mechanically simple dispenser, which will store a loaf of bread in an air-tight housing and will dispense one or more slices of bread at the user's discretion. Further, a need exists for a bread dispenser which is reliable and is easy and convenient to use by a wide range of persons, including handicapped persons, elderly persons, and persons involved in the food service industries.

BRIEF SUMMARY OF THE INVENTION

The need for an economical, mechanically simple apparatus for dispensing one or more slices of bread and storing the remaining bread in an air-tight fashion are realized in the present invention which is also convenient and easy to use. The present invention comprises an air-tight upper housing for containing a loaf of bread in a vertical disposition, a lower housing or base containing a motor for the upward dispensing of the bread from the upper housing, and a lifting mechanism. The upper housing is a generally rectangular cubic container having four elongated vertical sides, a sealed bottom and an open upper end which can be closed with a resealable lid. The upper housing is securedly attached to the lower housing or base along the lower edges of the four elongated vertical sides.

Depending horizontally from one of the four elongated vertical sides is a vertical tube containing an externally threaded support rod. The interior of the tube communicates with the interior of the upper housing via a slot extending the vertical length of the shaft. A lift shelf is supported by the threaded support shaft by an internally threaded support collar. The lift shelf extends into the upper housing through the slot and comprises a generally square, horizontal plate for supporting the loaf of bread. The horizontal dimensions of the lift shelf are somewhat smaller than the horizontal cross-sectional dimensions of the upper housing so that the lift shelf may move freely vertically within the upper housing.

The lower housing or base contains the means for activating the lift shelf so as to dispense the bread from the top of the upper housing. Generally, the dispensing means comprises a motor, various gears, and the appropriate control means, including switches and wiring, to allow mechanical connection of the motor to the threaded support shaft and to allow the activation of the motor to drive the lifting means. As the lower housing or base contains the motor and various control means, it is relatively heavy compared to the remainder of the apparatus and, therefore, provides a stable base for the invention.

In operation, the user first raises the lid. The motor then is activated by one or more switches and, through various gears and bearings, causes the threaded support shaft to rotate about its vertical axis. As the threaded support shaft rotates, the external threads on the shaft cooperate with the internal threads of the support collar, thus vertically lifting the lift shelf and any bread resting on the lift shelf. As the loaf of bread is raised, the user removes one or more slices of bread. The dispenser comprises one or more switches to provide, for example, the following functions: raising the loaf of bread one slice at a time; raising the loaf of bread in a continuous fashion; and lowering the lift shelf when loading a loaf or if the lift shelf inadvertently was lifted too high. Optionally, a circuit can be added to the invention which, when the lift shelf reaches its maximum height, causes the motor to reverse, returning the lift shelf to the lowest, or loading position, ready for the next loaf of bread.

Accordingly, it is an object of the present invention to provide an apparatus for storing one or more slices of bread in an air-tight fashion and to allow the dispensation of one or more slices of bread therefrom.

It is another object of the present invention to provide an apparatus which will store and dispense bread in a manner minimizing damage to the bread during storage and dispensation.

A further object of the present invention is to provide an apparatus which will allow handicapped or elderly people to obtain one or more slices of bread at a time without having to deal with the conventional Polyethylene bag and twist-tie combination.

A still further object of the present invention is to provide an apparatus for dispensing bread which utilizes an electric dispensing and loading means.

Another object of the present invention is to provide an apparatus in which a loaf of bread is loaded, stored and dispensed vertically so as to achieve a small footprint resulting in the use of minimal counter space.

Yet another object of the present invention is to provide an apparatus which will automatically load a complete loaf of bread rather than having to load the bread a portion at a time.

It is another object of the present invention to provide an apparatus which can be loaded without human contact with the loaf of bread.

An additional object of the present invention is to provide an apparatus which can dispense one, two, or more slices of bread depending upon the user's discretion.

These objects and other objects, features and advantages of the present invention will become more apparent to one skilled in the art when the following description is read with reference to the accompanying drawings wherein like reference numerals denote corresponding parts through the several views.

DETAILED DESCRIPTION OF A PREFERRED EMBODIMENT

Turning now to the drawings, the dispenser 20 of the present invention comprises a generally rectangular cubic upper housing 3 for storing the bread 16 secured to a generally flat cubic lower housing or base 1 containing the means for dispensing the bread 16.

Figure 1:
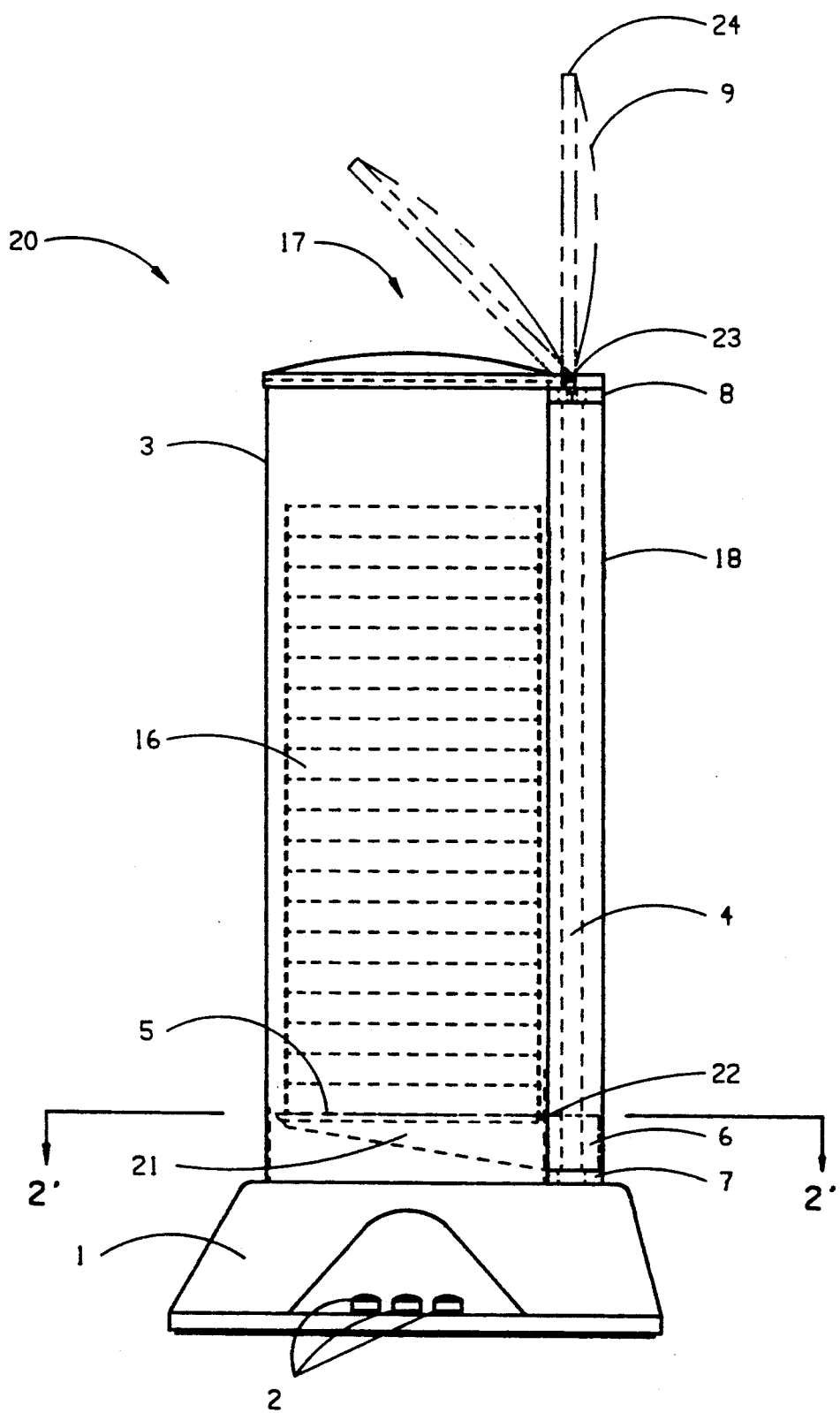
FIG. 1 is a side elevational view of the present invention showing the lid in a closed position, with phantom lines denoting the lid in partial open and open positions, and the of bread, the threaded support shaft and the lift shelf.
Figure 4:
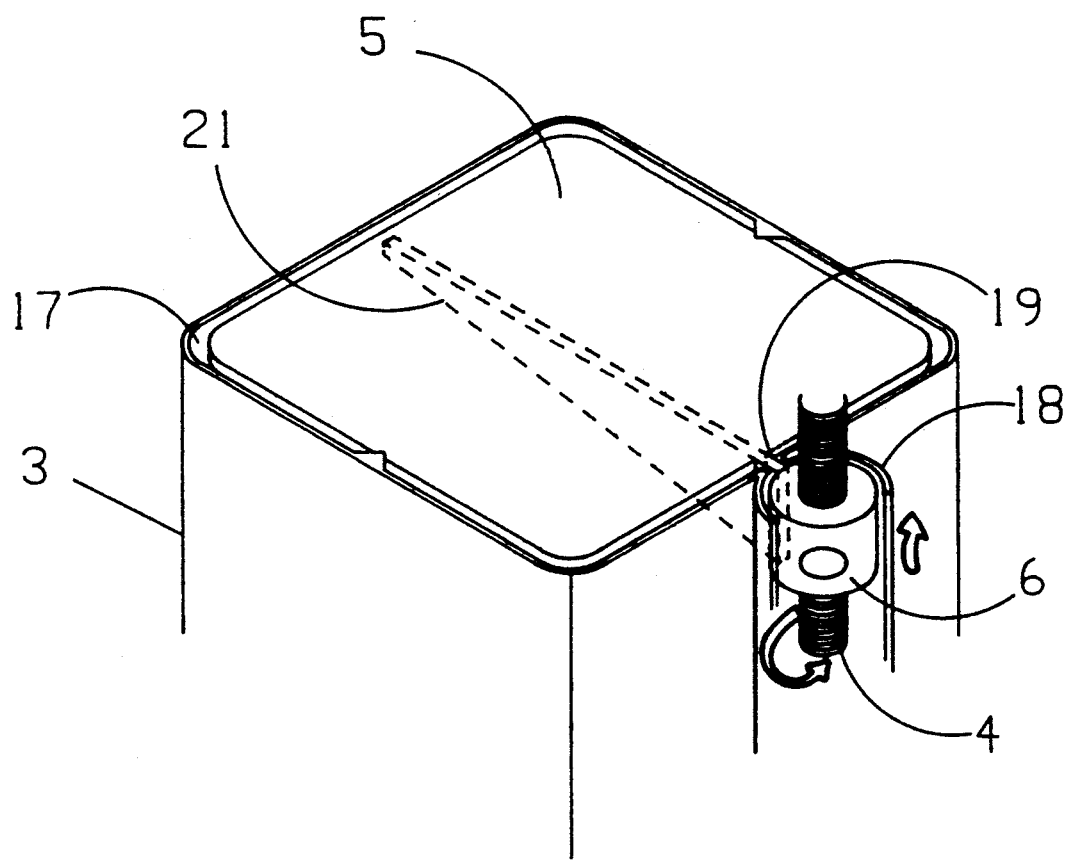
FIG. 4 is a partial isometric view, partly in cross-section, showing the lift shelf and threaded support shaft.
Figure 5:
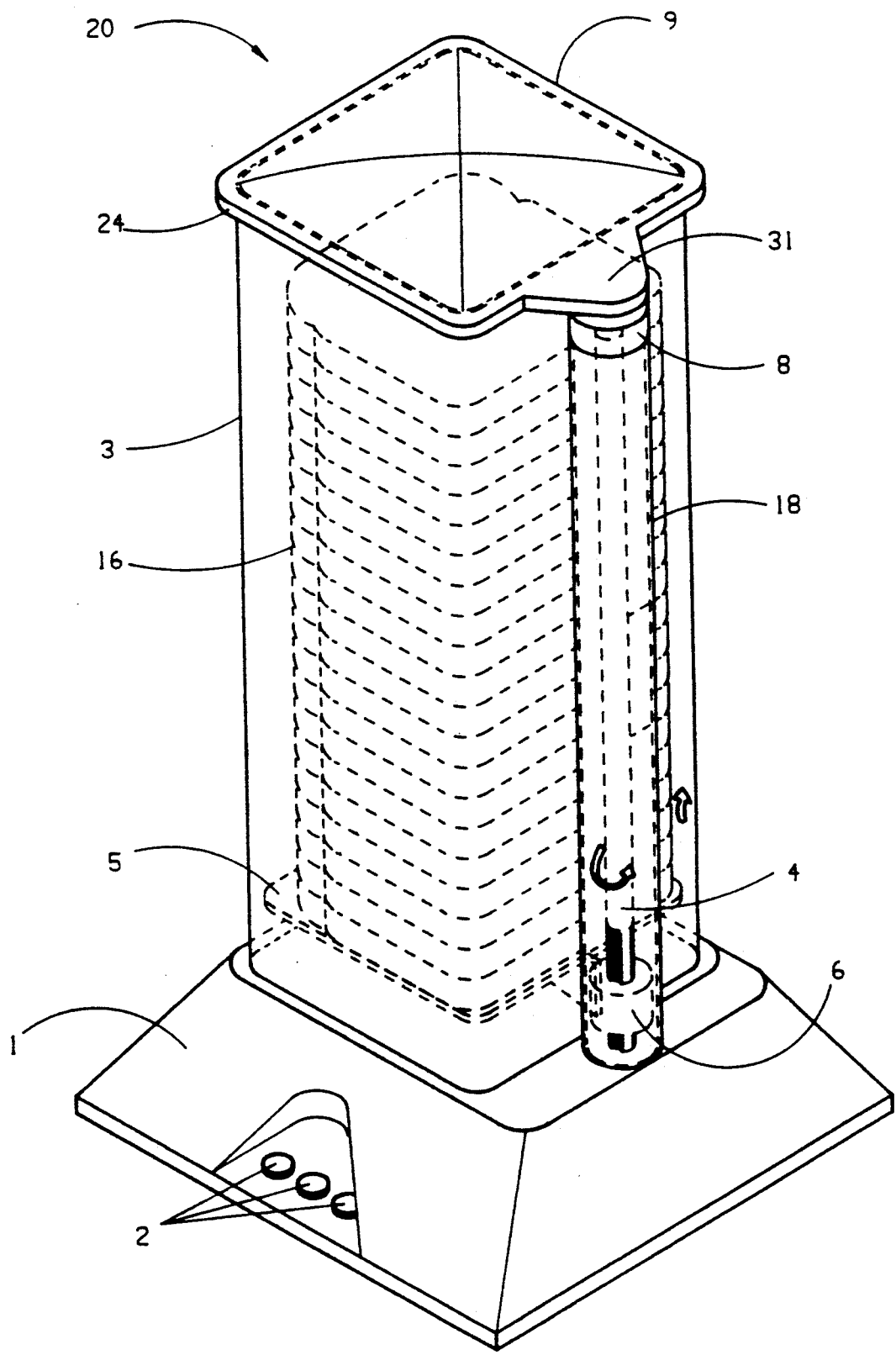
FIG. 5 is an isometric view showing in phantom lines a loaf of bread and the lift shelf.
Figure 7:
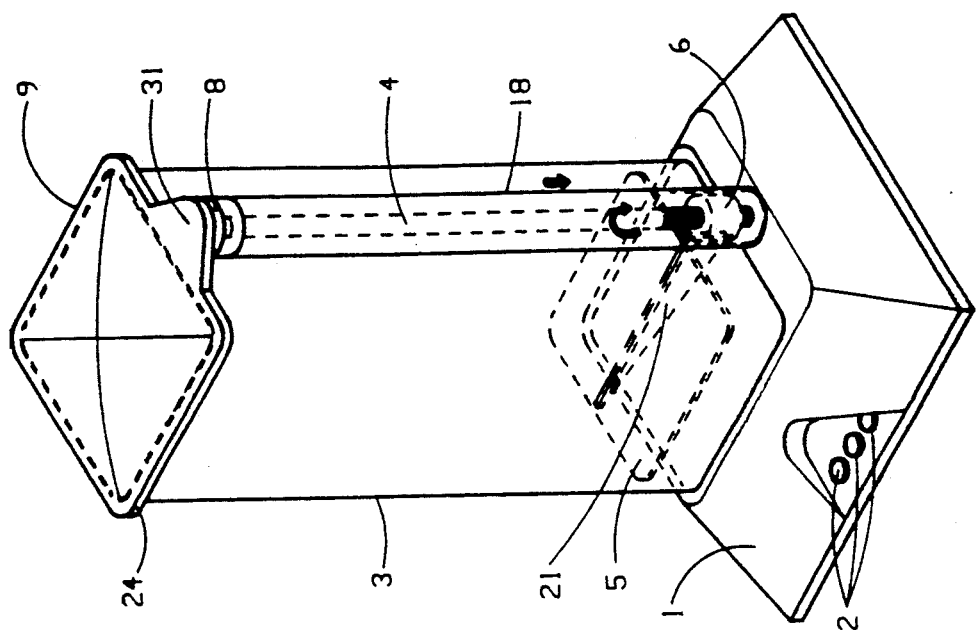
FIG. 7 is an isometric view similar to FIG. 6 showing the lift shelf in its lowermost position.
Figure 6:
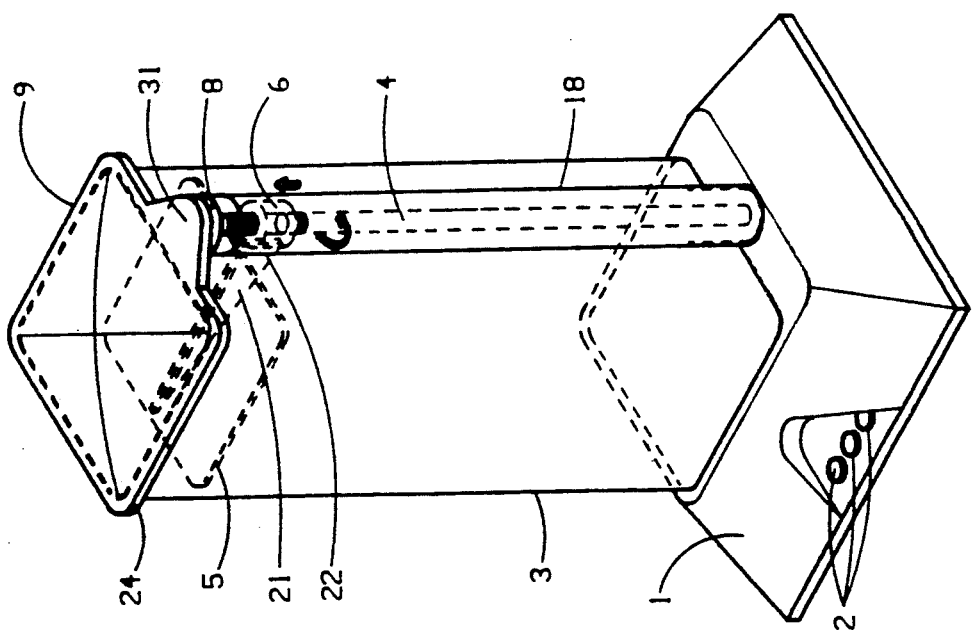
FIG. 6 is an isometric view showing the lift shelf in its uppermost position.

As best seen in FIGS. 1, 4 and 5, the upper housing 3 is a generally rectangular structure having four elongated vertical sides integrally connected to each other along their elongated edges so as to form a hollow, elongated tube with a generally square or rectangular cross-section. The horizontal cross-section of upper housing 3 is slightly larger than the dimensions of a slice of bread so that the bread may fit easily within the interior of the upper housing. The open upper end or mouth 17 of the upper housing 3 is formed by the upper edges or ends of the four elongated vertical sides. The lower end of the upper housing 3 is sealed by a bottom side integrally connected along its edges to each of the respective lower edges or ends of the four elongated vertical sides.

Vertically disposed and integrally attached to one of the four elongated vertical sides is hollow threaded support shaft tube 18. Tube 18 is generally circular in horizontal cross-section and runs the vertical length of the elongated vertical side to which it is attached. Tube 18 generally is located along the vertical center line of the elongated vertical side. The interior of tube 18 communicates with the interior of upper housing 3 via communication slot 19. Slot 19 also runs the entire vertical length of the elongated vertical side, thus allowing the interior of tube 18 to communicate with the interior of upper housing 3 along the entire length of vertical elongated side.

Vertically disposed within tube 18 is threaded support shaft 4. Shaft 4 has a typical screw thread helically disposed about its outer surface. Shaft 4 extends vertically the length of tube 18 and extends out through the bottom of tube 18 into the lower housing or base 1. Shaft 4 is rotatably maintained in the center of tube 18 by a first bearing support 8 located and secured near the top end of tube 18 and a second bearing support 7 located and secured near the bottom of tube 18. Shaft 4 is rotably supported by bearing supports 7, 8, and is rotably secured to the moving mechanism as more fully described below.

The bread support means comprises lift shelf 5 and internally threaded support collar 6. Shelf 5 is a generally flat rectangular component located in a horizontal plane and has approximately the same horizontal dimensions as a slice of bread. Shelf 5 is located within the interior of upper housing 3 and is supported within the upper housing 3 by support arm 21. Support arm 21 is a generally planar component extending below and normal to shelf 5 and is integrally attached to collar 6 via throat 22. Throat 22 is of such dimensions that it will fit within slot 19 and will move freely vertically within slot 19. Therefore, throat 22 connects lift shelf 5 located within upper housing 3 to threaded support collar 6 located within tube 18. Collar 6 has an internal thread which complements and cooperates with the external thread on shaft 4, thus allowing motion imparted to collar 6 via shaft 4, more fully described below, to be transferred to shelf 5 via support arm 21.

Lid 9 is disposed at the upper end of upper housing 3 and serves to close and seal mouth 17. When lid 9 is opened, the interior of upper housing 3 can communicate with the ambient and bread 16 can be removed from or placed in the dispenser 20, and when lid 9 is closed, the interior of upper housing 3 is effectively sealed off from the ambient. Lid 9 has two best embodiments. As shown best in FIG. 1, the first embodiment of lid 9 is hingedly attached to the upper end of tube 18 via hinge 23. In this first embodiment, lid 9 generally is a more rigid material and remains attached to the dispenser 20 and is raised and lowered in an arc-like fashion about hinge 23. As shown best in FIG. 5, the second embodiment of lid 9 is a separate component which can be releasably secured and removed from the top of the upper housing 3 and tube 18. In this second embodiment, lid 9 generally is a more flexible material, much like the material lids are constructed from for conventional plasticwear.

Both embodiments of lid 9 have the same general configuration, comprising a generally flat or slightly domed component having the same approximate dimensions as the horizontal cross-section of the upper housing 3. Rim 24 depends normal from the perimeter of lid 9 and extends around the entire perimeter of lid 9, with the exception in the first embodiment of a small area located by slot 19. When lid 9 is in its closed position, the generally flat or domed component rests on top of the upper edges or ends of elongated vertical sides and rim 24 extends around and outside of the perimeter of upper housing 3 for a short vertically downward distance, thus allowing lid 9 to seal mouth 17. In the second embodiment of lid 9, lid 9 includes an appendage 31 depending horizontally from one edge of lid 9. This appendage 31 has the same general configuration as the horizontal cross-section of tube 18. The purpose of the appendage 31 is to cover the top of shaft 18 when lid 9 is in its closed position. In the second embodiment of lid 9, rim 24 extends about the entire perimeter of lid 9, including about the perimeter of the appendage 31.

Figure 2:
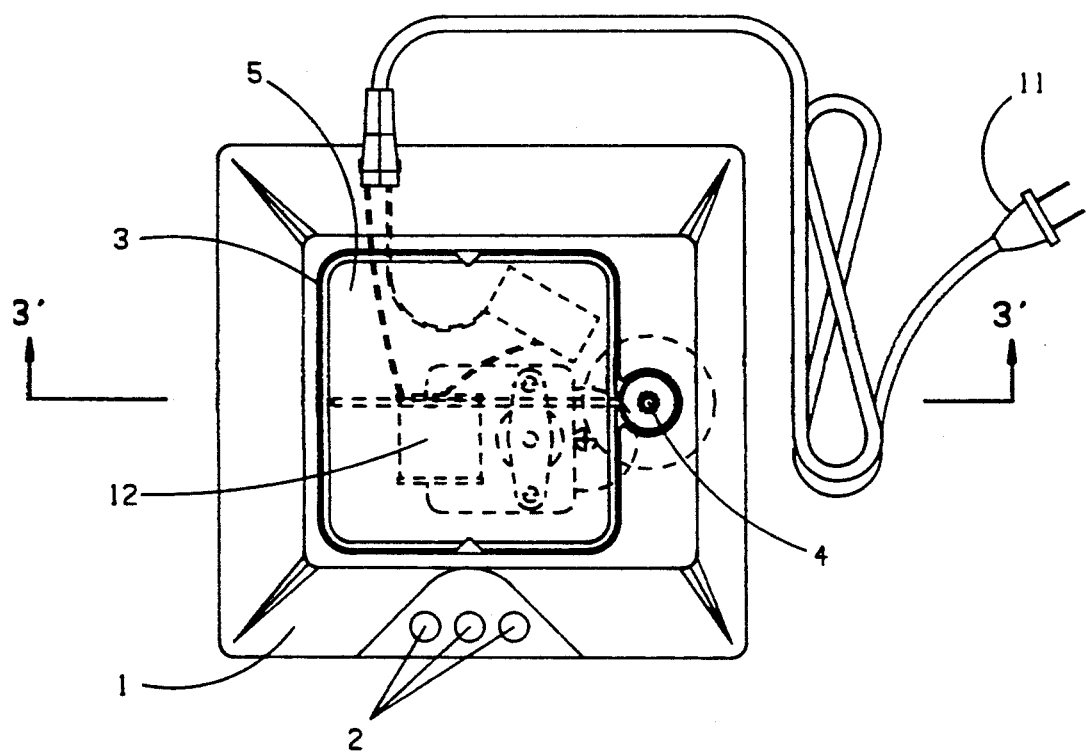
FIG. 2 is a cross-sectional view taken along line 2—2 in FIG. 1, showing in phantom lines the motor, gears, and wiring.
Figure 3:
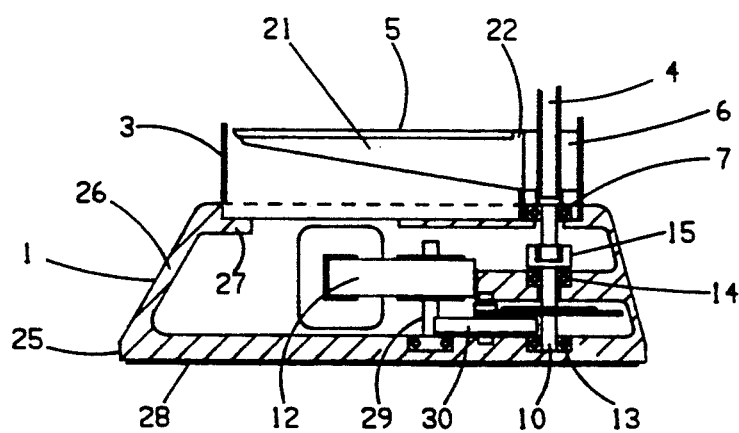
FIG. 3 is a side elevational cross-section taken along line 3—3 of FIG. 2.

Referring now to FIGS. 1, 2 and 3, it can be seen that lower housing or base 1 is a generally flattened rectangular cubic structure. For illustrative purposes only, the vertical cross-sectional shape for the lower housing or base 1 has been chosen to be generally trapezoidal for pleasing aesthetics. In FIG. 3 it can be seen that lower housing or base 1 comprises a lower flat rectangular panel 25 having four upstanding sides 26 integrally attached to the four edges of the panel 25 so as to form a generally cup-shaped structure having a hollow interior. Sides 26 have inwardly projecting rims 27 to support the upper housing 3. The bottom end of upper housing 3 is secured to the rims 27 of lower housing or base 1 by any conventional means, such as adhesive, epoxy or melting. Pad or feet 28 optionally are secured to the bottom of the lower housing or base 1 to prevent slippage on a counter or other supporting surface.

Lower housing or base 1 houses motor 12, and the drive mechanism which comprises output drive shaft 10, and power transfer gear 15 which mechanically connects motor 12 to threaded support shaft 4. Referring now to FIG. 3, the mechanical details of the motor and drive mechanism are shown. Motor 12 is mounted within the interior of lower housing or base 1 by any conventional support means. In the embodiment shown, motor drive shaft 29 transfers the motion imparted to it by motor 12 to output drive shaft 10 via transfer gear 30. Output drive shaft 10 is connected to threaded support shaft 4 via coupler 15 such that when output drive shaft 10 is rotated, the rotational motion is transferred to shaft 4. The various shafts and gears are secured within lower housing or base 1 by various known conventional means such as bearing supports 13, 14 and screws and bolts. Motor 12 is typically a conventional AC motor which receives its electricity through a conventional plug 11.

Alternatively, motor 12 can be connected directly to shaft 4 resulting in a direct drive mechanism. With a direct drive mechanism, motor drive shaft 29, transfer gear 30, and output drive shaft 10 are unnecessary. In another alternative embodiment, transfer gear 30 can be replaced with a transfer belt to transfer the motion from motor drive shaft 29 to output drive shaft 10. Transfer gear 30 is the preferred embodiment as gears result in a more accurate and reliable transfer of motion than do belts.

When motor 12 is activated, the transfer of motion through the various drive shafts and gears causes shaft 4 to rotate about its vertical axis. As shaft 4 rotates, the external threads on the outside surface of shaft 4 cooperate with the internal threads of threaded support collar 6, thus causing collar 6 and shelf 5 to move vertically upward or downward, depending on the direction of rotation of shaft 4. In the bread dispensing mode, shaft 4 rotates in a direction which will cause collar 6 and shelf 5 to travel vertically upward, thus forcing the bread 16 out of the top of upper housing 3.

Motor 12 is activated by an activator button 2 or a plurality of activator buttons. The embodiment selected for this illustration utilizes three activator buttons. The first button activates the motor 12 for a time long enough to raise shelf 5 a distance equivalent to the thickness of one slice of bread. This is the single slice dispensing mode. The second button activates the motor 12 continuously, such that shelf 5 rises continuously, such that a plurality of bread slices are raised. The second button either can be a button which needs to be held down for the motor 12 to operate continuously, or a switch which activates the motor when pressed the first time and deactivates the motor when pressed the second time. This is the continuous bread dispensing mode. The third button reverses the direction of the shaft 4 so that shelf 5 is lowered. This button is used if the shelf 5 is lifted too high and needs to be lowered in order to shut the lid 9, or to load the dispenser 20 with bread 16.

The control mechanism for the motor 12 and the lifting mechanism including the shaft 4 and shelf 5 can include several optional features. One such optional feature is a locator means for determining when the shelf 5 has reached the top of the shaft 4. This locator means then signals the motor 12 either to stop so shaft 4 will cease to rotate and shelf 5 will not be forced too high, or to reverse so as to reverse the rotational direction of shaft 4, thus lowering the shaft 5 to its lowest Position. A second optional feature is a sensor means for detecting whether the downward pressure on shelf 5 is greater than a given amount. The pressure sensor is activated, for instance, when lid 9 is closed and shelf 5 is forcing the bread 16 against the closed lid 9. The pressure sensor would detect increased pressure and would signal the motor to either stop or reverse rotation of shaft 4 so that no damage is caused to the dispenser 20 or the bread 16.

The dispenser 20 is simple and convenient to operate. To load the dispenser 20, the user activates the motor 12 and the lifting mechanism to raise the shelf 5 to its uppermost position. The user then opens one end of the packaging which contains the loaf of bread 16, orients the loaf of bread vertically and places one end of the loaf of bread on the shelf 5. The motor 12 is activated so as to rotate shaft 4 in a direction causing shelf 5 to lower. The user holds onto the bread packaging while the loaf of bread is lowered into the dispenser 20. When the shelf 5 has reached its lowest position, the loaf of bread is fully loaded into the dispenser, the wrapper is thrown away or recycled, and the lid 9 is moved to its closed position. To obtain a slice of bread 16, the user opens the lid 9 and activates one of the activator buttons 2 so as to raise the loaf of bread. Depending on the number of activator buttons 2 utilized on the dispenser 20, the user selects one of the activator buttons to raise the shelf 5 a desired distance, thus dispensing a desired number of slices of bread 16. When the desired slice of bread 16 is removed, the top of the remaining stack of slices of bread 16 will be roughly with co-planar with mouth 17. Lid 9 can then be closed, insuring an air-tight seal on upper housing 3.

The preferred embodiment of the dispenser 20 has a pleasing appearance and can be rested on a kitchen counter or any food service location. Being no larger than a conventional blender or the like, the dispenser 20 has a small foot print and takes up little room As previously discussed, the dispenser 20 is particularly suited for use in a conventional kitchen or in the food service industry such as cafeteria. Additionally, the dispenser 20 is very well-suited for handicapped, elderly, or arthritic persons who have trouble manipulating a common plastic wrapper and twist-tie combination.

The dispenser 20 can be made from a variety of materials. Generally, upper housing 3, lower housing or base 1, tube 18, and lid 9 are made from high impact plastic, with all but lower housing or base 1 being made from a transparent plastic. Alternatively, lid 9 may be made from a more flexible plastic so as to create a better seal when closing mouth 17. To hide the motor 12 and lift mechanism, lower housing or base 1 generally is made from an opaque plastic. Threaded support shaft 4 and the various gearing and shaft mechanisms may be made from a metal, but also can be made from a high strength polymer, such as nylon. The actual materials used are unimportant and may be selected from any appropriate materials. The use of plastics significantly lowers the weight and manufacturing costs of the dispenser 20, and are easier to clean.

It will be obvious to those skilled in the art that many variations may be made in the embodiment here chosen for the purpose of illustration without departing from the scope thereof, as defined by the appended claims.

What is claimed is:

1. An apparatus for storing and dispensing bread comprising:
   (a) An elongate housing means for containing a plurality of stacked, horizontal bread slices in a vertically disposed array, said elongate housing means having rigid, elongated vertical sides, a closed bottom end and an open top end;
   (b) an elongate, cylindrical shaft having a hollow interior and being vertically disposed and attached to one of said elongated vertical sides and extending substantially the entire vertical length of said one of said elongated vertical sides, the hollow interior of said elongate vertical shaft in communication with the interior of said elongate housing means;
   (c) a lid means for sealing said open end of said elongate housing means;
   (d) a shelf means for supporting said vertically disposed stacked, horizontal bread slices, wherein said shelf means comprises a generally flat, horizontally disposed platform and a vertically disposed sleeve having an internal screw thread and being integrally attached to said platform, said shelf means being located within said housing and said sleeve being located within said elongate vertical shaft;
   (e) a lifting means for raising and lowering said shelf means, wherein said lifting means comprises a vertically disposed rod having an external screw thread helically disposed about the outer surface of said rod, said external screw thread of said rod cooperating with said internal screw thread of said sleeve such that rotation of said vertically disposed rod causes said shelf means to travel vertically upwards or downwards, and is located within said elongate vertical shaft;
   (f) a moving means mechanically connected to said lifting means for moving said lifting means such that activation of said moving means transfers motion to said lifting means through said vertically disposed rod to facilitate the lifting of said shelf means thereby allowing access to said bread slices from said open end of said elongate housing means when said lid means is in a position away from said open end of said elongate housing means;
   (g) a base means for supporting said elongate housing means and for containing said moving means; and
   (h) an activator means for activating said moving means a length of time sufficient to cause said shelf means to move vertically upwards a distance equivalent to the thickness of one slide of bread.

2. An apparatus for storing and dispensing bread as claimed in claim 1, wherein said lid means is hingedly attached to said elongate upper housing means.

3. An apparatus for storing and dispensing bread as claimed in claim 1, wherein said moving means is activated by a plurality of activator buttons.

4. An apparatus for storing and dispensing bread as claimed in claim 3, wherein one of said plurality of activator buttons causes said moving means to operate a length of time sufficient to cause said shelf means to move vertically upwards a distance equivalent to the thickness of one slide of bread.

5. An apparatus for storing and dispensing bread as claimed in claim 3, wherein one of said plurality of activator buttons activates the moving means continuously.

6. An apparatus for storing and dispensing bread as claimed in claim 3, wherein one of said plurality of activator buttons causes said moving means to operate in a reverse direction thus causing said shelf means to move in a vertically downward direction.

7. An apparatus for storing and dispensing bread as claimed in claim 1, wherein said elongate housing means is of such dimensions to contain at least one conventional loaf of bread, said lid means creates a virtually air-tight seal with the open end of said elongate housing means, and said moving means creates motion in more than one direction.

8. An apparatus for storing and dispensing bread as claimed in claim 7, wherein said moving means is mechanically connected to said vertically disposed rod, and said vertically disposed rod is mechanically connected to said shelf means, thereby allowing motion produced by said moving means to be transferred to said shelf means so as to dispense one or more slices of bread to the user when activated.

* * * * *